(12) United States Patent
Feng

(10) Patent No.: US 6,834,165 B2
(45) Date of Patent: Dec. 21, 2004

(54) PARALLEL OPTO-ELECTRIC STRUCTURE FOR HIGH SENSITIVITY AND WIDE BANDWIDTH OPTICAL TRANSCEIVER

(75) Inventor: Kai D. Feng, Essex Junction, VT (US)

(73) Assignee: International Business Machines Corporation, Armonk, NY (US)

(*) Notice: Subject to any disclaimer, the term of this patent is extended or adjusted under 35 U.S.C. 154(b) by 597 days.

(21) Appl. No.: 09/774,068

(22) Filed: Jan. 31, 2001

(65) Prior Publication Data

US 2002/0003649 A1 Jan. 10, 2002

(30) Foreign Application Priority Data

Jun. 13, 2000 (CA) .............................................. 2311433

(51) Int. Cl.[7] .............................................. H04B 10/06
(52) U.S. Cl. ........................ 398/202; 398/206; 398/208; 398/210; 398/213; 398/214; 398/135; 250/214 A; 250/214 R; 250/214 C; 250/214 LA; 250/214 AG; 330/59; 330/308
(58) Field of Search ................................ 398/202, 206, 398/208, 213, 210, 214, 135; 250/214 A, 214 R, 214 C, 214 LA, 214 AG; 330/59, 308

(56) References Cited

U.S. PATENT DOCUMENTS

| 5,371,623 A | * | 12/1994 | Eastmond et al. .......... 359/167 |
| 5,790,295 A | * | 8/1998 | Devon ........................ 398/202 |
| 6,392,219 B1 | * | 5/2002 | McCormick et al. ... 250/214 R |
| 6,567,200 B1 | * | 5/2003 | Pammer et al. ............. 398/202 |

* cited by examiner

*Primary Examiner*—Hanh Phan
(74) *Attorney, Agent, or Firm*—Wan Yee Cheung, Esq.; McGinn & Gibb, PLLC

(57) ABSTRACT

An optical receiver circuit including a plurality of PIN diodes, each associated with a dedicated element transimpedance amplifier, the outputs of the element transimpedance amplifiers being connected to a summing amplifier which sums the voltages output from the element transimpedance amplifiers. The optical receiver circuit provides the same output voltage value as a single large PIN diode having an active area comparable to the sum of the active areas of the smaller PIN diodes, and thus has the same high sensitivity as the single large PIN diode but a much wider bandwidth.

20 Claims, 1 Drawing Sheet

PARALLEL OPTO-ELECTRIC STRUCTURE FOR HIGH SENSITIVITY AND WIDE BANDWIDTH OPTICAL TRANSCEIVER

BACKGROUND OF THE INVENTION

1. Field of the Invention

The present invention relates to an optical transceiver, and more particularly to a receiver circuit for an optical transceiver having a plurality of photodiodes.

2. Description of the Related Art

An optical receiver converts optical pulses to corresponding electrical signals. The optical receiver in an infrared (IR) optical transceiver typically utilizes an IR-sensitive PIN diode, which emits an electric current in proportion to the intensity of infrared light striking the active area of the diode.

For example, FIG. 1 illustrates the general structure of a conventional optical receiver circuit for an IR transceiver. A PIN diode D has its anode connected to the power Supply $V_{dd}$ to create a bias voltage across the PIN diode D, and its cathode connected to the inverting input of an operational amplifier AMP. A feedback resistor $R_f$ is connected between the output and the inverting input, so that the operational amplifier AMP operates as a transimpedance amplifier, in that its output voltage $V_o$ is proportional to the input current $I_p$ from the PIN diode:

$$V_o = -I_p * R_f \quad (1)$$

$$I_p = P_{op} * A * RE \quad (2)$$

where $P_{op}$ is the incident optical power intensity, A is the active area of the PIN diode, and RE is the coefficient of responsiveness of the PIN diode.

In equation (1) a negative sign is added to $I_p$, because if $I_p$ flows from $V_{dd}$ (positive) to the inverting input of the operational amplifier AMP, the output voltage $V_o$ will be negative. Substituting equation (2) into equation (1) yields:

$$V_o = -P_{op} * A * RE * R_f \quad (3)$$

The coefficient of responsiveness RE is determined by the active material used in the PIN diode. The wavelength to which the PIN diode is sensitive will dictate the material used in the diode. Therefore, once the wavelength is determined, RE is fixed and can be considered as a constant.

The design of any conventional IR receiver suffers from PIN diode parasitic capacitance when both high sensitivity and wide bandwidth are required. Generally, the bandwidth of the transimpedance amplifier itself can be very wide, but the total bandwidth of the front edge stage is limited by the single pole RC low pass filter formed by the input capacitance $C_{in}$ of the operational amplifier AMP and the resistance of the feedback resistor $R_f$. A single pole RC low pass filter has the following gain-frequency relation:

$$G(f) = \frac{G(0)}{1 + j*2*\pi*f*R*C_1} \quad (4)$$

where G(f) is the gain as a function of frequency, G(0) is the DC gain, f is the frequency, R is the resistance, C is the capacitance, and j is the imaginary unit.

The bandwidth BW of a single pole RC low pass filter is:

$$BW = \frac{1}{2*\pi*R*C} \quad (5)$$

Applying equation (5), the bandwidth of the transimpedance amplifier described above can be expressed as:

$$BW_t = \frac{1}{2*\pi*R_{in}*C_{in}} \quad (6)$$

where $BW_t$ is the transimpedance amplifier bandwidth, $C_{in}$ is the capacitance on the transimpedance amplifier inverting input, $R_{in}$ is the input resistance of the transimpedance amplifier, $R_{in}=R_f/G_{open}$, and $G_{open}$ is the open loop gain of the transimpedance amplifier.

The input capacitance $C_{in}$ includes PIN diode parasitic capacitance $C_p$ and the operational amplifier input capacitance $C_e$. Based on current VLSI technology, $C_e$ can be much smaller than $C_p$ (i.e., $C_p >> C_e$), so $C_e$ can be ignored and effectively $$C_{in} = C_p \quad (7)$$

The parasitic capacitance $C_p$ of a PIN diode is proportional to the PIN diode active area:

$$C_p = K*A \quad (8)$$

where K is a coefficient, and A is the PIN active area. Substituting equations (7) and (8) into equation (6) yields:

$$BW_t = 1/(2*\pi*R_{in}*K*A) \quad (9)$$

When a high sensitivity is required, a large active area A is needed to get more optical power. However, because the bandwidth $BW_t$ is inversely proportional to the active area A, an increase of the area A results in a corresponding decrease in the bandwidth $BW_t$ of the circuit. It can be seen from equations (3) and (9) that it is very difficult to achieve both high sensitivity and a wide bandwidth in a single large area PIN diode.

SUMMARY OF THE INVENTION

In view of the foregoing and other problems, disadvantages, and drawbacks of the conventional methods and structures, an object of the present invention is to provide an optical receiver circuit which replaces a single PIN diode having a large active area with a plurality of (e.g., preferably equal) smaller PIN diodes, each PIN diode being associated with a dedicated element transimpedance amplifier, the outputs of the element transimpedance amplifiers being connected to a summing amplifier which sums the voltages output from the element transimpedance amplifiers.

The parallel structure of the optical receiver circuit of the present invention provides the same output voltage as a single PIN diode having a large active area comparable to the sum of the active areas of the smaller PIN diodes in the optical receiver circuit of the present invention, and thus can achieve the same high sensitivity as the single PIN diode having a large active area. However, the summing amplifier can be designed to have a much wider bandwidth than that of the element transimpedance amplifiers. Since the total bandwidth of the optical receiver circuit depends on the bandwidth of the summed voltages at the input of the summing amplifier, the total bandwidth of the circuit is the sum of the bandwidths of the individual transimpedance amplifiers, which is much greater than that of a receiver circuit utilizing a single PIN diode with a comparable active area.

In a first aspect, the present invention provides an optical receiver circuit, including a plurality of element transimpedance amplifiers and a summing amplifier, the outputs of the element transimpedance amplifiers being connected through resistance elements to an input of the summing amplifier. When a photodiode connected to an input of each element transimpedance amplifier emits a current signal responsive to an optical signal striking the photodiode, a voltage is produced at the output of each element transimpedance amplifier proportional to an intensity of the optical signal, and the voltages output by the element transimpedance amplifiers are summed by the summing amplifier to produce an output electrical signal.

In another aspect, the present invention further provides a photoelectric transceiver having an optical receiver circuit including a plurality of element transimpedance amplifiers, a summing amplifier, the outputs of the element transimpedance amplifiers being connected through resistance elements to an input of the summing amplifier, and a photodiode connected to an input of each element transimpedance amplifier. When the photodiode connected to the input of each element transimpedance amplifier emits a current signal responsive to an optical signal striking the photodiode, a voltage is produced at the output of each element transimpedance amplifier proportional to an intensity of the optical signal, and the voltages output by the element transimpedance amplifiers are summed by the summing amplifier to produce an output electrical signal.

In a further aspect of the present invention, each transimpedance amplifier includes an operational amplifier having a resistance element connected between an output and an inverting input of the operational amplifier, each photodiode is connected to an inverting input of the respective element transimpedance amplifier and the outputs of the element transimpedance amplifiers are connected to an inverting input of the summing amplifier through an input resistor.

In a further aspect of the present invention, the optical signal includes an infrared signal and the photodiodes include PIN diodes.

The present disclosure relates to subject matter contained in Canadian Patent Application No. 2,311,433 filed Jun. 13, 2000, which is expressly incorporated herein by reference in its entirety.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENT OF THE INVENTION

Figure 1:
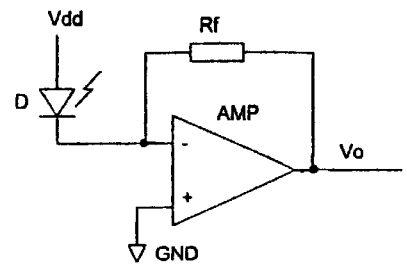
FIG. 1 is a schematic diagram of a conventional optical receiver circuit.
Figure 2:
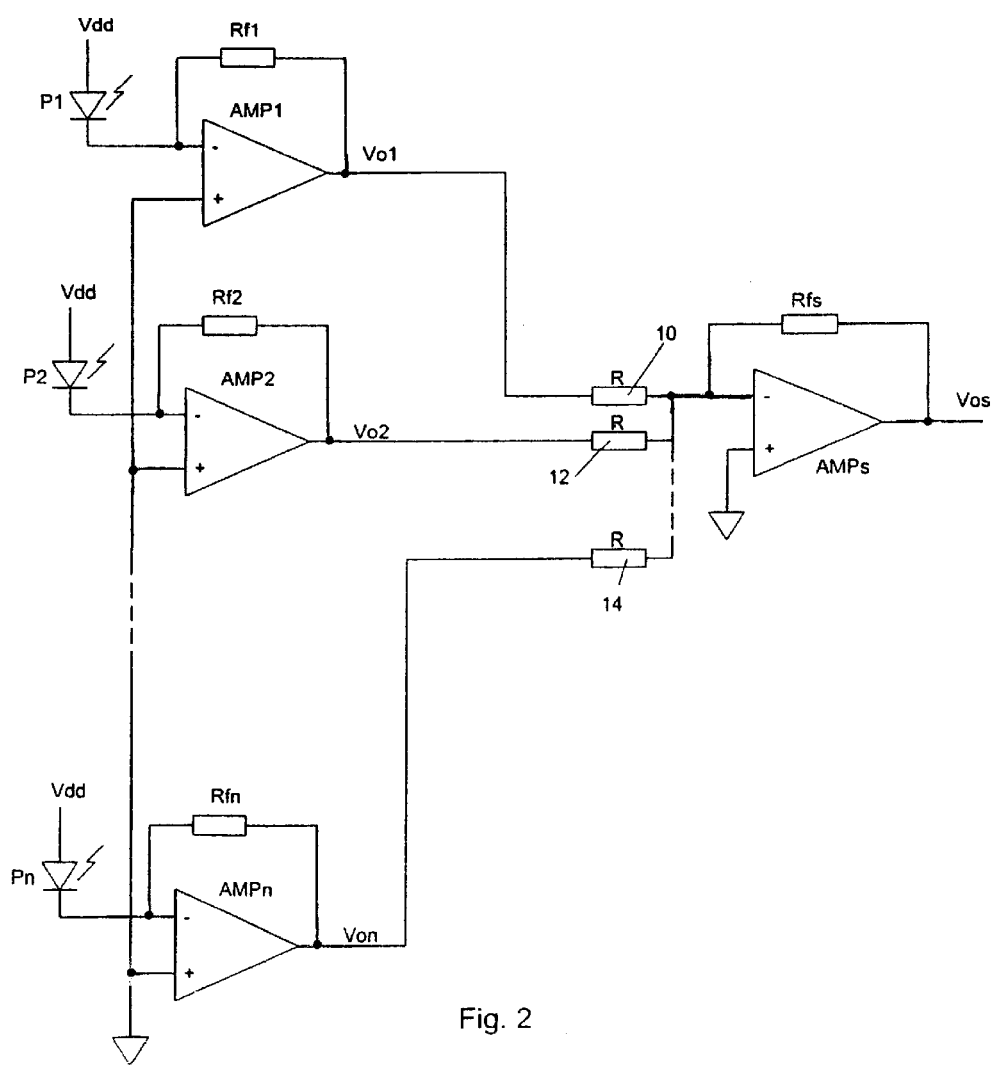
FIG. 2 is a schematic diagram of an optical receiver circuit according to the present invention.

FIG. 2 illustrates a preferred embodiment of an optical receiver circuit according to the invention.

In FIG. 2, a plurality of photodiodes (e.g., in the preferred embodiment PIN diodes $P_1, P_2 \ldots P_N$) have their anodes connected to a voltage supply $V_{dd}$ to supply a bias voltage across the diodes $P_1, P_2 \ldots P_N$. The cathode of a first PIN diode $P_1$ is connected to the inverting input of a first element transimpedance amplifier (unreferenced), including an operational amplifier $AMP_1$ having a resistance element such as feedback resistor $R_1$ with a resistance $R_{f1}$ connecting the output of the operational amplifier $AMP_1$ to the inverting input of the operational amplifier $AMP_1$.

Similarly, the cathode of a second PIN diode $P_2$ is connected to the inverting input of a second element transimpedance amplifier (unreferenced) including an operational amplifier $AMP_2$ having a feedback resistor $R_2$ with a resistance $R_{f2}$ connecting the output of the operational amplifier $AMP_2$ to the inverting input of the operational amplifier $AMP_2$. The construction is similar up to an Nth PIN diode $P_N$ which is similarly connected to an Nth element transimpedance amplifier including an operational amplifier $AMP_N$ having a feedback resistor $R_N$ with a resistance $R_{fN}$ connecting the output of the operational amplifier $AMP_N$ to the inverting input of the operational amplifier $AMP_N$.

In the preferred, non-limiting embodiment shown, the non-inverting input of each operational amplifier $AMP_1$, $AMP_2 \ldots AMP_N$ is grounded, creating a constant voltage difference between $V_{dd}$ and the respective inverting input of each element transimpedance amplifier when the PIN diodes are active.

The outputs $V_{o1}, V_{o2} \ldots V_{oN}$ of the element transimpedance amplifiers are each connected to the inverting input of a summing amplifier. The summing amplifier includes an operational amplifier $AMP_S$ having a feedback resistor $R_{fS}$ connecting the output of the operational amplifier $AMP_S$ to the inverting input of the operational amplifier $AMP_S$. Resistance elements such as resistors 10, 12, 14 are the input resistors of the summing amplifier. Such resistors have the same value of R and the ratio of $R_{sf}/r$ determines the gain of the summing amplifier. The output signal $V_{oS}$ from the summing amplifier is fed to an IR receiver circuit for processing.

In operation, when optical radiation strikes the PIN diodes $P_1, P_2 \ldots P_N$ each PIN diode emits a current proportional to the optical power intensity of the incident optical light striking the active area of each diode. Each respective voltage $V_{o1}, V_{o2} \ldots V_{oN}$ output by the element operational amplifiers $AMP_1, AMP_2 \ldots AMP_N$ is proportional to the current $I_{p1}, I_{p2} \ldots I_{pN}$ from the respective PIN diode $P_1, P_2 \ldots P_N$. Since in the preferred embodiment all PIN diodes are identical and all element transimpedance amplifiers are identical, the element transimpedance amplifier output voltages $V_{o1}, V_{o2} \ldots V_{oN}$ are equal.

The element transimpedance amplifier output signals $V_{o1}$, $V_{o2} \ldots V_{oN}$ are transmitted to the inverting input of the summing amplifier $AMP_S$ through resistors 10, 12, 14. Thus, the output voltage $V_{oS}$ from the summing amplifier is proportional to the current $I_{total}$ at the inverting input of the summing amplifier $AMP_{oS}$, represented by $V_{o1}*R_{fS}/R + V_{o2}*R_{fS}/R + \ldots + V_{on}*R_{fS}/R$.

Thus, according to the invention, a large area PIN diode is replaced with N (preferably but not necessarily equal) smaller PIN diodes cumulatively providing substantially the same active area as the large PIN diode, and each of the PIN diodes having its own dedicated element transimpedance amplifier. For each element transimpedance amplifier:

$$V_{o1} = P_{op}*RE*R_{f1}*A/N$$

$$V_{o2} = P_{op}*RE*R_{f2}*A/N$$

.

.

.

$$V_{oN} = P_{op}*RE*R_{fN}*A/N$$

$AMP_{oS}$ is a general operational amplifier which sums all of the output signals $V_{o1}, V_{o2} \ldots V_{oN}$ from the element transimpedance amplifiers. Where all element transimpedance amplifier feedback resistors $R_{f1}, R_{f2} \ldots R_{fn}$ are equal and $R_{fS} = R$, the output $V_{oS}$ is:

$$V_{oS} = V_{o1} + V_{o2} + \ldots + V_{oN} \quad (10)$$
$$= N * (P_{op} * RE * R_f * A/N)$$
$$= P_{op} * RE * R_f * A$$

From a comparison of equations (3) and (10), it will be apparent that the parallel structure according to the invention has the same output voltage value (i.e., the negative sign can be ignored) as that of a single large area PIN diode optical receiver circuit in which the diode has an active area equal to the sum of the active areas of the smaller diodes $P_1$, $P_2$ ... $P_N$. Thus, the parallel structure according to the invention achieves the same high sensitivity as the single large area PIN diode optical receiver.

Applying equations (4) and (9) to each element transimpedance amplifier yields:

$$G_i(f) = \frac{G_i(0)}{1 + j*2*\pi*R_{in}*K*A/N} \quad (11)$$

$$BW_i = \frac{1}{2*\pi*R_{in}K*A/N} = \frac{N}{2*\pi*R_{in}*K*A} \quad (12)$$

where i=1, 2 ... N.

Thus, the bandwidth of each element transimpedance amplifier is N times that of the bandwidth of the single large area PIN diode optical receiver.

According to the general definition of gain, each element transimpedance amplifier has the following relation among gain, input current and output voltage:

$$G_i(f) = V_{oi}/I_{pi} \text{ or } V_{oi} = G_i(f)*I_{pi}$$

where i=1, 2, 3 ... N.

For the output signal $V_{oS}$ $$V_{oS} = V_{01} + V_{02} + V_{03} + \ldots + V_{0N}$$
$$= G_i(f) * (I_{p1} + I_{p2} + I_{p3} + \ldots + I_{pN})$$
$$= G_i(f) * I_{total}$$

The output voltage has a gain G(f)

$$G(f) = V_{oS}/I_{total} = G_i(f) \quad (13)$$

Equation (13) shows that the parallel element transimpedance amplifier structure in the optical receiver circuit of the invention has the same gain-frequency relationship as that of each element transimpedance amplifier. Thus, the bandwidth of the parallel structure of the circuit of the present invention is the same as the bandwidth of each element transimpedance amplifier, which is N times the bandwidth of the single large area PIN diode optical receiver in which the PIN diode has a large active area substantially equal to the sum of the active areas of the PIN diodes $P_1$, $P_2$ ... $P_N$.

Thus, the optical receiver circuit according to the present invention has the same sensitivity as the single large area PIN diode optical receiver, but N times the bandwidth of the single large area PIN diode optical receiver in which the PIN diode has an active area comparable to the sum of the active areas of the PIN diodes $P_1$, $P_2$ ... $P_N$. Hence, the optical receiver circuit of the present invention achieves both high sensitivity and a wide bandwidth.

While a preferred embodiment of the invention has been thus described by way of example, it will be apparent to those skilled in the art that certain modifications and adaptations may be made without departing from the scope of the invention. The invention includes all such modifications and adaptations as fall within the scope of the claims.

Having thus described my invention, what I claim as new and desire to secure by Letters Patent is as follows:

1. An optical receiver circuit, comprising:
   a plurality of element transimpedance amplifiers; and
   a summing amplifier, the outputs of the element transimpedance amplifiers being connected through resistance elements to an input of the summing amplifier,
   wherein, when a plurality of substantially identical photodiodes connected to inputs of respective ones of the element transimpedance amplifiers emit current signals responsive to an optical signal striking the photodiodes with substantially equal intensity, a substantially equal voltage is produced at the output of each element transimpedance amplifier proportional to the intensity of the optical signal, and the voltages output by the element transimpedance amplifiers are summed by the summing amplifier to produce an output electrical signal.

2. The optical receiver circuit of claim 1, wherein each transimpedance amplifier comprises an operational amplifier having a resistance element connected between an output and an inverting input of the operational amplifier.

3. The optical receiver circuit of claim 2, wherein each photodiode is connected to an inverting input of the respective element transimpedance amplifier.

4. The optical receiver circuit of claim 3, wherein the outputs of the element transimpedance amplifiers are connected to an inverting input of the summing amplifier.

5. The optical receiver circuit of claim 4, wherein the outputs of the element transimpedance amplifiers are connected to the inverting input of the summing amplifier through resistance elements.

6. The optical receiver circuit of claim 5, wherein the resistance elements comprise resistors.

7. The optical receiver circuit of claim 6, wherein the optical signal comprises an infrared signal.

8. The optical receiver circuit of claim 7, wherein the photodiodes comprise PIN diodes.

9. A photoelectric transceiver having an optical receiver circuit for converting an optical signal received from an optical signal source into a current signal, said photoelectric transceiver comprising:
   a plurality of element transimpedance amplifiers;
   a summing amplifier, the outputs of the element transimpedance amplifiers being connected through resistance elements to an input of the summing amplifier; and
   a plurality of substantially identical photodiodes, each photodiode connected to an input of a respective element transimpedance amplifier, the photodiodes being positioned to receive a substantially equal intensity of the optical signal from the optical signal source,
   wherein, when the photodiodes emit current signals responsive to the optical signal striking the photodiodes, a substantially equal voltage is produced at the output of each element transimpedance amplifier proportional to the intensity of the optical signal, and the voltages output by the element transimpedance amplifiers are summed by the summing amplifier to produce an output electrical signal.

10. The photoelectric transceiver of claim 9, wherein each transimpedance amplifier comprises an operational amplifier having a resistance element connected between an output and an inverting input of the operational amplifier.

11. The photoelectric transceiver of claim 10, wherein each photodiode is connected to an inverting input of the respective element transimpedance amplifier.

12. The photoelectric transceiver of claim 11, wherein the outputs of the element transimpedance amplifiers are connected to an inverting input of the summing amplifier.

13. The photoelectric transceiver of claim 12, wherein the outputs of the element transimpedance amplifiers are connected to the inverting input of the summing amplifier through resistance elements.

14. The photoelectric transceiver of claim 13, wherein the resistance elements comprise resistors.

15. The photoelectric transceiver of claim 14, wherein the optical signal comprises an infrared signal.

16. The photoelectric transceiver of claim 15, wherein the photodiodes comprise PIN diodes.

17. An optical receiver circuit, comprising:

a plurality of first amplifiers; and a second amplifier, the outputs of the first amplifiers being connected through resistance elements to an input of the second amplifier, wherein, when a plurality of substantially identical photodiodes connected to inputs of the first amplifiers emit current signals responsive to an optical signal striking the photodiodes with substantially equal intensity, a substantially equal voltage is produced at the output of each first amplifier proportional to the intensity of the optical signal, and the voltages output by the first amplifiers are summed by the second amplifier to produce an output electrical signal.

18. The optical receiver circuit of claim 17, wherein each first amplifier comprises an operational amplifier having a resistance element connected between an output and an inverting input of the operational amplifier.

19. The optical receiver circuit of claim 18, wherein each photodiode is connected to an inverting input of the respective first amplifier.

20. The optical receiver circuit of claim 19, wherein the outputs of the first amplifiers are connected to an inverting input of the second amplifier.

* * * * *